US009198813B2

(12) United States Patent
Hsu et al.

(10) Patent No.: US 9,198,813 B2
(45) Date of Patent: Dec. 1, 2015

(54) MOVEMENT DEVICE HAVING A STEWART PLATFORM

(71) Applicant: YUAN ZE UNIVERSITY, Taoyuan County (TW)

(72) Inventors: Yeh-Liang Hsu, Taoyuan County (TW); Po-er Hsu, Taipei (TW); Cheng-Hao Chang, New Taipei (TW)

(73) Assignee: YUAN ZE UNIVERSITY, Taoyuan County (TW)

( * ) Notice: Subject to any disclaimer, the term of this patent is extended or adjusted under 35 U.S.C. 154(b) by 287 days.

(21) Appl. No.: 13/897,402

(22) Filed: May 18, 2013

(65) Prior Publication Data

US 2014/0339391 A1 Nov. 20, 2014

(51) Int. Cl.

*F16M 1/00* (2006.01)
*A61G 5/10* (2006.01)
*A61G 5/04* (2013.01)

(52) U.S. Cl.

CPC .............. *A61G 5/1056* (2013.01); *A61G 5/046* (2013.01); *A61G 5/107* (2013.01); *A61G 5/1072* (2013.01); *A61G 5/1075* (2013.01)

(58) Field of Classification Search

CPC ... A61G 5/107; A61G 5/1072; A61G 5/1075; A61G 5/046; A61G 5/1056; B25J 17/0266
USPC ........... 248/562, 580, 581, 603, 619; 280/657
See application file for complete search history.

(56) References Cited

U.S. PATENT DOCUMENTS

| | | | | |
|---|---|---|---|---|
| 4,651,589 | A * | 3/1987 | Lambert | 74/469 |
| 6,047,610 | A * | 4/2000 | Stocco et al. | 74/479.01 |
| 2008/0161829 | A1* | 7/2008 | Kang | 606/130 |
| 2008/0262653 | A1* | 10/2008 | Arakelyan et al. | 700/245 |
| 2009/0019960 | A1* | 1/2009 | Nabat et al. | 74/490.03 |
| 2010/0234844 | A1* | 9/2010 | Edelhauser et al. | 606/56 |
| 2013/0306384 | A1* | 11/2013 | Baradat et al. | 180/8.6 |

* cited by examiner

*Primary Examiner* — Gwendolyn Baxter
(74) *Attorney, Agent, or Firm* — Li&Cai Intellectual Property (USA) Office

(57) ABSTRACT

A movement device having a Stewart platform has a supporting body disposed on a horizontal plane, a movable platform, and four extensible links rotatably connected between the supporting body and the platform. The extension directions of the upper extensible links are in parallel with one another. When the movement device is in an equilibrium condition, the upper extensible links lie in a first common plane. When the movement device is in an equilibrium condition, vertical projections of the extension directions of the extensible links on a normal plane slant toward the horizontal plane; the vertical projection of the extension direction of the first bottom extensible link slants toward a first direction whereas the vertical projections of the extension directions of the other three extensible links slant toward a second direction, which is opposite to the first direction.

19 Claims, 12 Drawing Sheets

MOVEMENT DEVICE HAVING A STEWART PLATFORM

BACKGROUND

1. Technical Field

The present disclosure relates to a movement device having a Stewart platform, in particular, to a movement device having a Stewart platform with four extensible links.

2. Description of Related Art

Stewart platform has been used in many applications, for example flight simulators, machine tools, biped locomotion system and surgery manipulators. The geometry of conventional Stewart platform is composed of a fixed base, a movable platform, and six linear actuators connecting the fixed base and the movable platform. This is a six degree of freedom universal-prismatic-spherical mechanism, including heave, surge, sway, yaw, pitch, and roll. No additional structural members are needed in Stewart platform because the actuators also function as structural members. The drawbacks of the Stewart platform are small workspace and complexity in control. In addition to controlling six linear actuators simultaneously in a nonlinear manner, the existence of singular positions creates more complexity in controlling the mechanism.

SUMMARY

An exemplary embodiment of the present disclosure provides movement device having a Stewart platform.

According to one exemplary embodiment of the present disclosure, the movement device having a Stewart platform has a supporting body disposed on a horizontal plane, a movable platform, a first extensible link, a second extensible link, a third extensible link and a fourth extensible link. The first extensible link and the second extensible link are each rotatably connected to and having one Degree of Freedom (DOF) with respect to the supporting body, and respectively rotating about two rotation axes. The first extensible link and the second extensible link are each rotatably connected to and having two DOFs with respect to the movable platform. The extension directions of the first extensible link and the second extensible link are parallel to each another. The third extensible link and the fourth extensible link are each rotatably connected to and having two DOFs with respect to the supporting body, and the third extensible link and the fourth extensible link are each rotatably connected to and having two DOFs with respect to the movable platform.

When the movement device is in an equilibrium condition, the extension directions of the first and the second extensible links lie in a first common plane, and the rotation axes are perpendicular to the first common plane. The vertical projections of the extension directions of the extensible links on a normal plane perpendicular to the horizontal plane slant toward the horizontal plane. The vertical projection of the extension direction of the third extensible link slants toward a first direction whereas the vertical projections of the extension directions of the other three extensible links slant toward a second direction opposite to the first direction.

To sum up, the present disclosure illustrates the movement device having a Stewart platform which can reduce the control complexity. The extensible links are arranged in such a way that they can be controlled to provide a steady and smooth adjustment process to users or to maintain the horizontal orientation of the platform when changing elevation or moving sideways.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
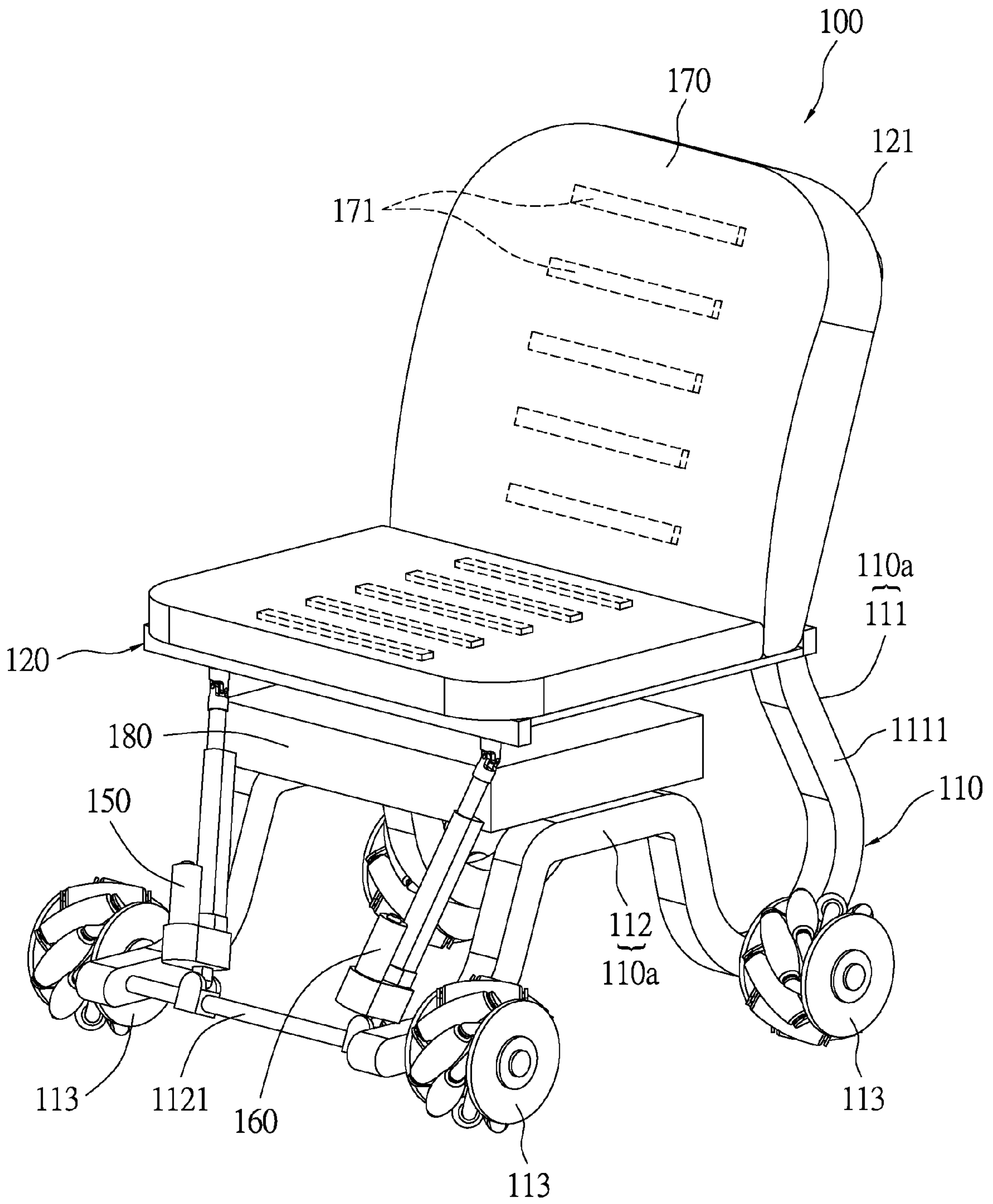
FIG. 1 is a schematic view illustrating a movement device having a Stewart platform provided in accordance to the first embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

A movement device having a Stewart platform 100 comprises a supporting body 110, a movable platform 120, a first upper extensible link 130, a second upper extensible link 140, a first bottom extensible link 150, and a second bottom extensible link 160. The supporting body 110 is disposed on a horizontal plane P0. The upper extensible links 130, 140 are each rotatably connected to and having one DOF with respect to the supporting body 110, and respectively rotating about two rotation axes X. Meanwhile, the upper extensible links 130, 140 are each rotatably connected to and having two DOFs with respect to the movable platform 120. The bottom extensible links 150, 160 are each rotatably connected to and having two DOFs with respect to the supporting body 110. Also, the bottom extensible links 150, 160 are each rotatably connected to and having two DOFs with respect to the movable platform 120.

In the instant embodiment, the horizontal normal plane P0 is the x-y plane. The upper extensible links 130, 140 are rotatably connected between an upper portion of the supporting body 110 and the movable platform 120. The bottom extensible links 150, 160 are rotatably connected between a bottom portion of the supporting body 110 and the movable platform 120. The extension directions of the upper extensible links 130, 140 are in parallel with one another. The movement device having a Stewart platform 100 is capable of motion of the moveable platform 120 in heaving, pitching, and swaying.

Figure 2:
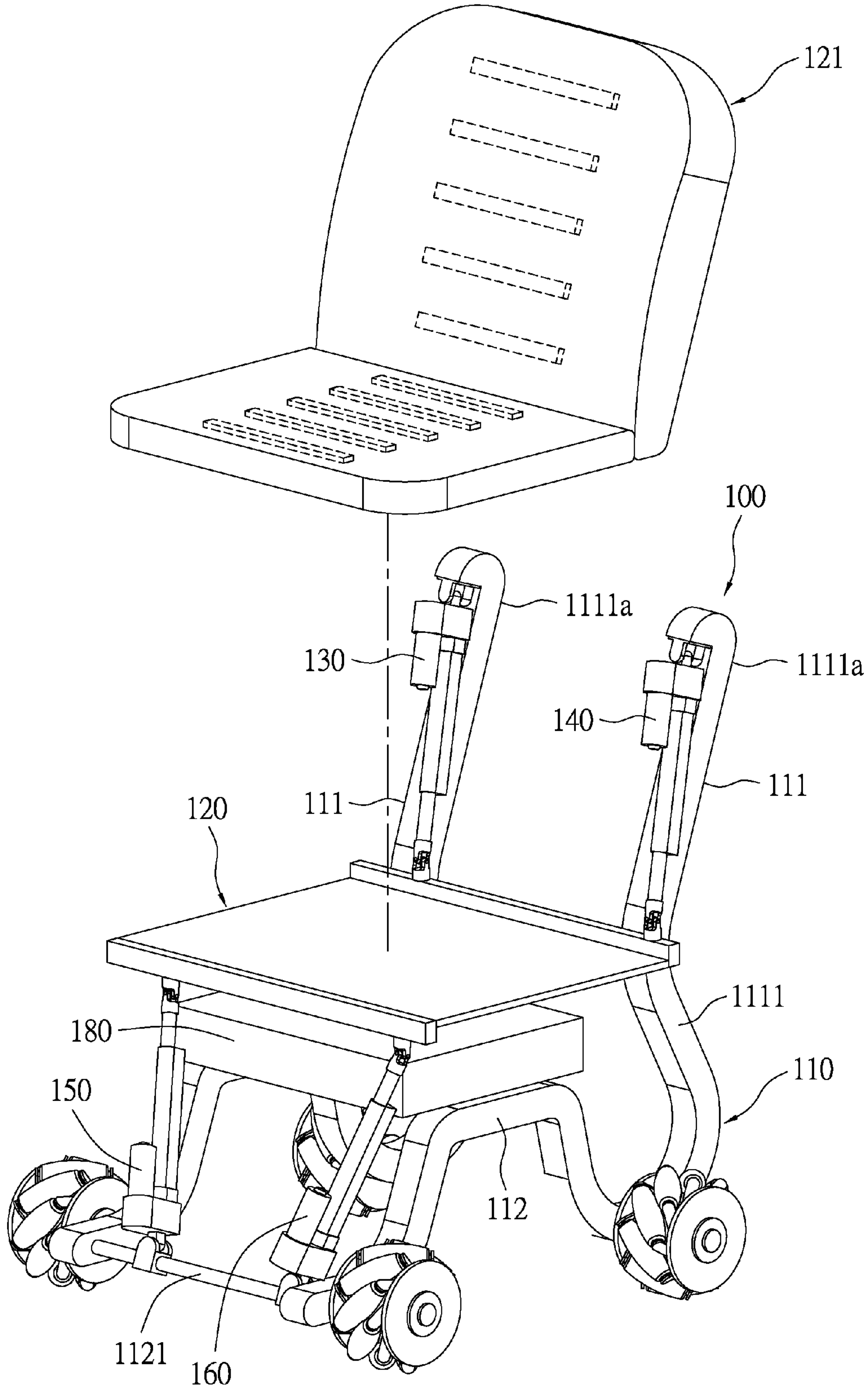
FIG. 2 is an exploded view illustrating the movement device having a Stewart platform provided in accordance to the first embodiment of the present disclosure.

For example, the movement device is converted into a wheelchair with seat adjustment mechanism, as shown in FIG. 1 and FIG. 2. The supporting body 110 may be an omni-directional moving vehicle and has an h-shape chassis 110*a*. The omni-directional moving vehicle 110 may use four Mecanum wheels 113 to facilitate movement of the vehicle 110 in all directions, including moving sideways, and zero radius of rotation. Hence, the vehicle 110 requires much less space than do general electrical wheelchairs in turning and sideway maneuvers. The movable platform 120 may be rectangular plate-shaped and has a seat 121. The movement device may further have a seat cushion 170 disposed on the seat 121. The seat cushion 170 has a plurality of soft pressure-sensing pads 171 for detecting the sitting pressure of the seat cushion 170. Equipped with soft pressure-sensing pads 171, the movable platform 120 also provides pressure management function when continuous, concentrated pressure is detected.

Referring to FIG. 1 and FIG. 2, the chassis 110*a* includes a side rack 111 and a bottom base 112. The upper extensible links 130, 140 are rotatably connected between the side rack 111 and the movable platform 120, and the bottom extensible links 150, 160 are rotatably connected between the bottom base 112 and the movable platform 120. The extensible links 130, 140 150, 160 is realized as linear actuators, and the movement device further has an operation device 180 for adjusting the length of extensible links 130, 140 150, 160. The operation device 180 is realized as programmable microcontroller. However, the actual types and/or structure adopted for the extensible links 130, 140 150, 160 and the operation device 180 is not limited by the present disclosure. The movement device having a Stewart platform 100 is capable of motion of the seat in swaying, heaving, and pitching. In other words, the platform 120 can be moved in the three degrees of freedom which are the two linear movements in longitudinal and vertical (y and z), and the rotation pitch.

Figure 3A:
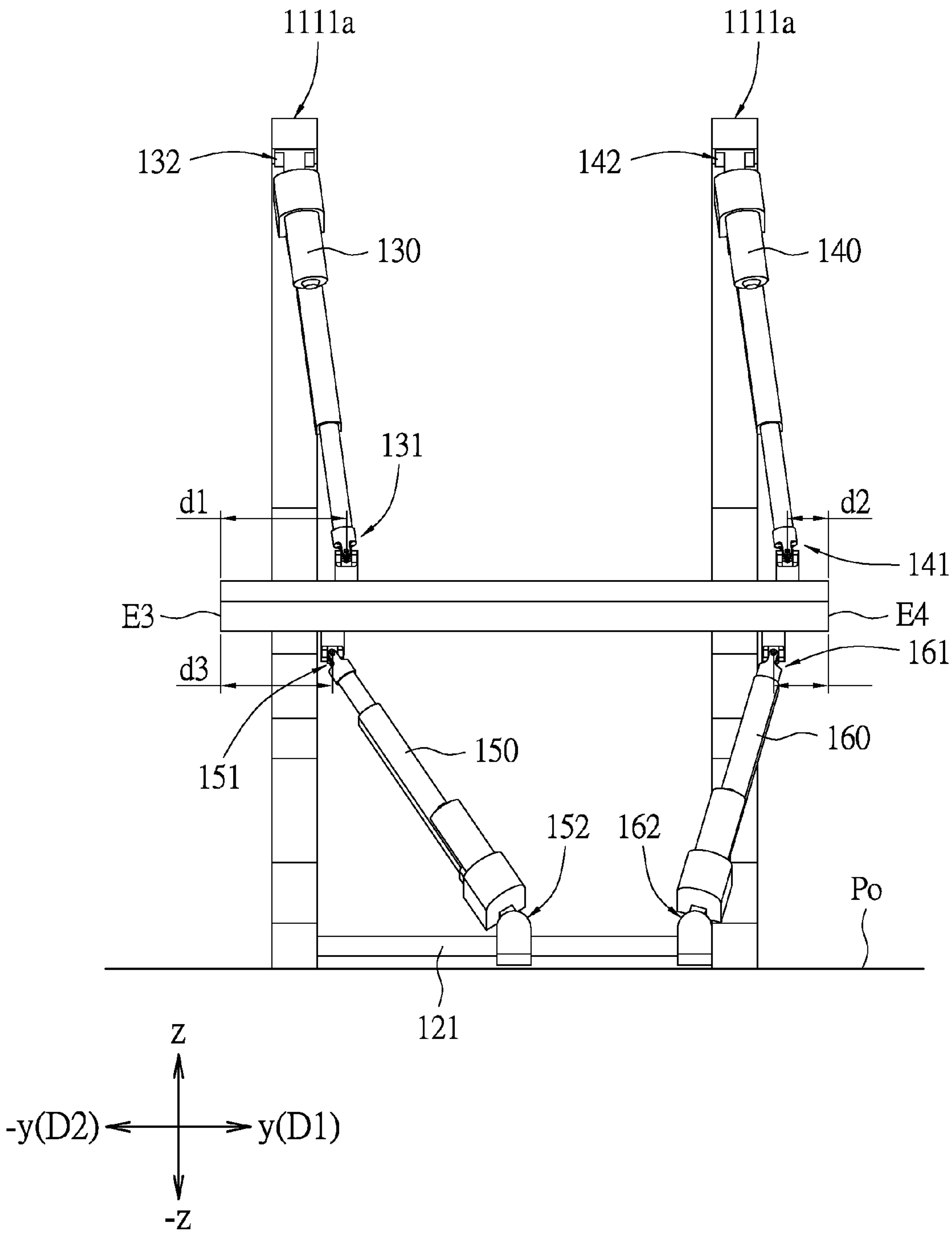
FIG. 3A is a front view illustrating the movement device having a Stewart platform provided in accordance to the first embodiment of the present disclosure.
Figure 3B:
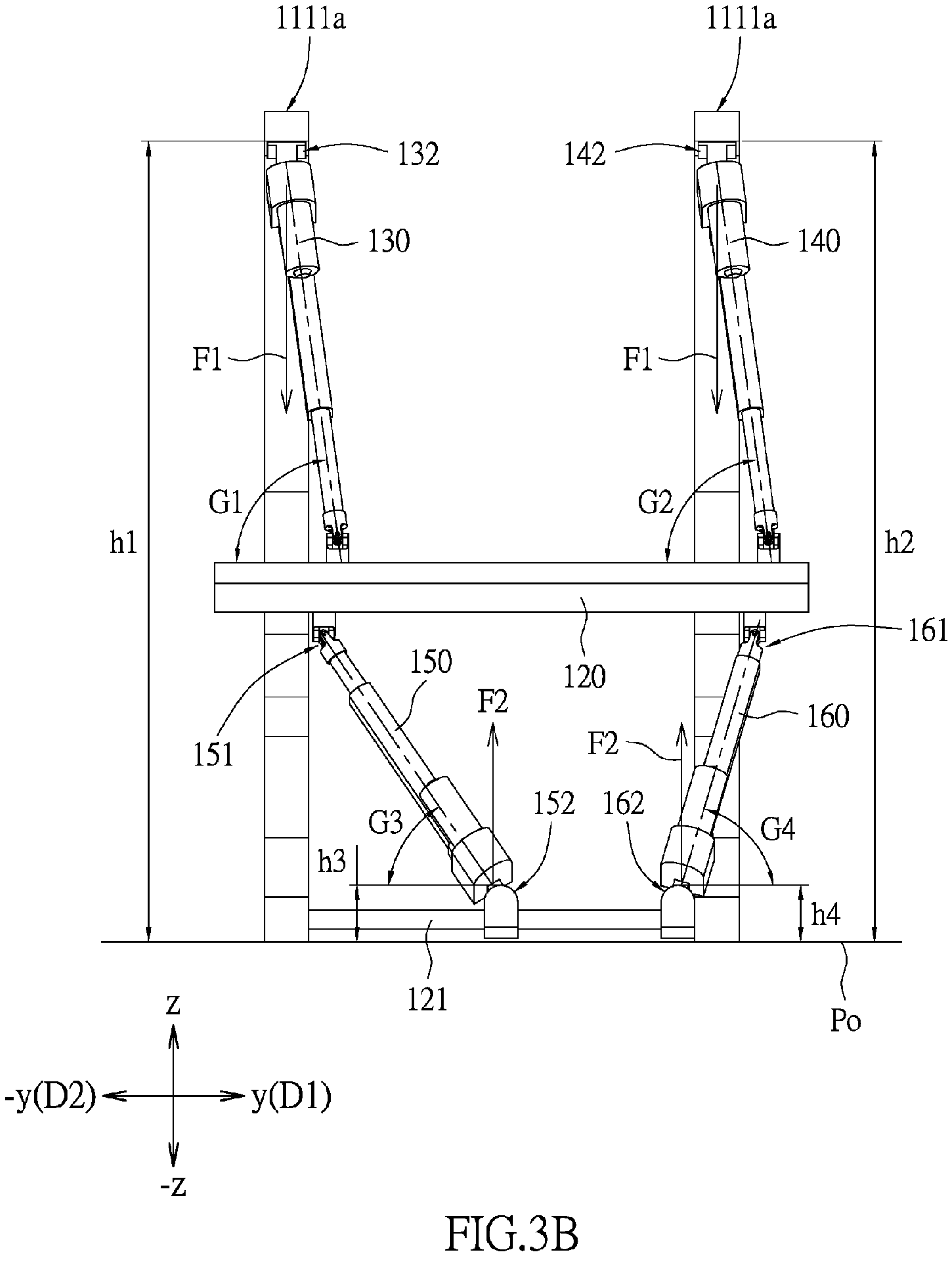
FIG. 3B is a front view illustrating the movement device having a Stewart platform provided in accordance to the first embodiment of the present disclosure.

In particular, referring to FIG. 3A and FIG. 3B, a first end 131, 141 of each upper extensible link 130,140 has a universal joint for rotatably connecting to a back edge E2 of the platform 120. A first end 151,161 of each bottom extensible link 150,160 has a universal joint for rotatably connecting to a front edge E1 of the platform 120. The front edge E1 is in parallel with the back edge E2. A second end 132,142 of each upper extensible link 130,140 has a revolute joint for rotatably connecting to the upper portion of the side rack 111. A second end 152,162 of each bottom extensible link 150,160 has a universal joint for rotatably connecting to the bottom base 112.

The first end 131 of the first upper extensible link 130 is rotatably connected to a left portion of the platform 120 and is distant from a left edge E3 of the platform 120 by a first distance d1. The first end 141 of the second upper extensible link 140 is rotatably connected to a right portion of the platform 120 and is distant from a right edge E4 of the platform 120, which is in parallel with the left edge E3, by a second distance d2. The first distance d1 is longer than the second distance d2.

Similarly, the first end 151 of the first bottom extensible link 150 is rotatably connected to the left portion of the platform 120 and is distant from the left edge E3 by a third distance d3. The first end 161 of the second bottom extensible link 160 is rotatably connected to the right portion of the platform 120 and is distant from the right edge E4 by a fourth distance d4. The third distance d3 is longer than the fourth distance d4. Moreover, a distance D1 between the first end 131 of the first upper extensible link 130 and the first end 141 of the second upper extensible link 140 is substantially equal to a distance D2 between the first end 151 of the first bottom extensible link 150 and the first end 161 of the second bottom extensible link 160.

Referring again to FIG. 3A and FIG. 3B, the side rack 111 has two posts 1111 arranged in parallel with one another. The two posts 1111 have the same height, that is, a vertical distance between the top end 1111*a* of one post 1111 and the horizontal plane P0 are substantially equal to a vertical distance between the top end 1111*a* of the other post 1111 and the horizontal plane P0. The second end 132, 142 of each upper extensible link 130, 140 is respectively rotatably connected to the top end 1111*a* of the posts 1111. In other words, a vertical distance h1 between the second end 132 of the first upper extensible link 130 and the horizontal plane P0 is substantially equal to a vertical distance h2 between the second end 142 of the second upper extensible link 140 and the horizontal plane P0.

The bottom base 112 of the chassis 110*a* has a crossbar 1121 arranged parallel with the horizontal plane P0. The second end 152,162 of each bottom extensible link 150,160 is respectively rotatably connected to the crossbar 1121. In other words, a vertical distance h3 between the second end 152 of the first bottom extensible link 150 and the horizontal plane P0 is substantially equal to a vertical distance h4 between the second end 162 of the second bottom extensible link 160 and the horizontal plane P0.

The movement device can be in an equilibrium condition, wherein the equilibrium condition is defined to be a condition, in which the movable platform 120 stays still and the gravity center of movable platform 120 is in the middle point of the moving path of each motion. When the movement device is in the equilibrium condition, the extension directions of the upper extensible links 130,140 may lie in a first common plane P 1, and the extension directions of the bottom extensible links 150,160 may lie in a second common plane P2. The rotation axes X are perpendicular to the first common plane P1.

Figure 4A:
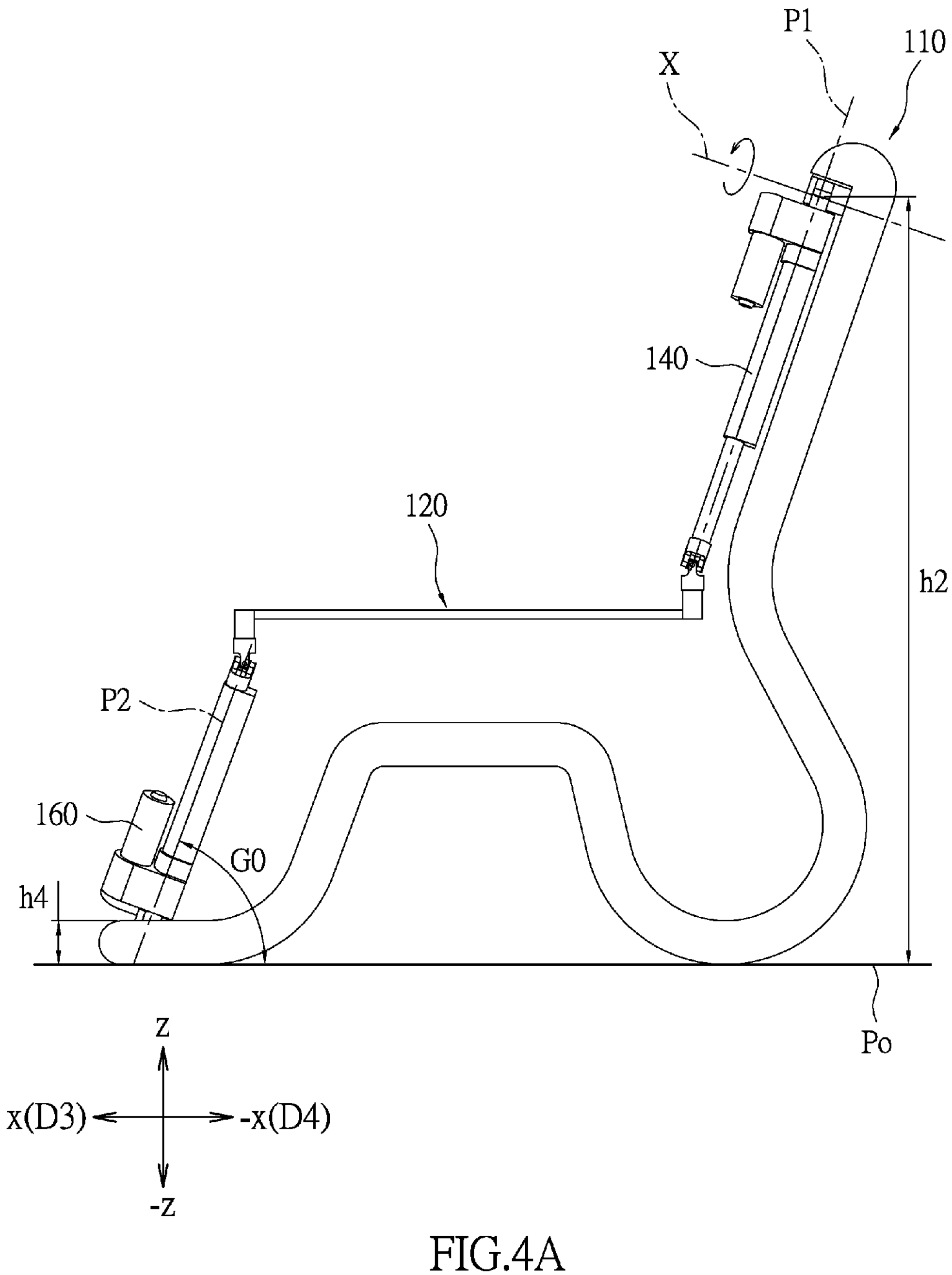
FIG. 4A is a side view illustrating the movement device having a Stewart platform provided in accordance to the first embodiment of the present disclosure.
Figure 4B:
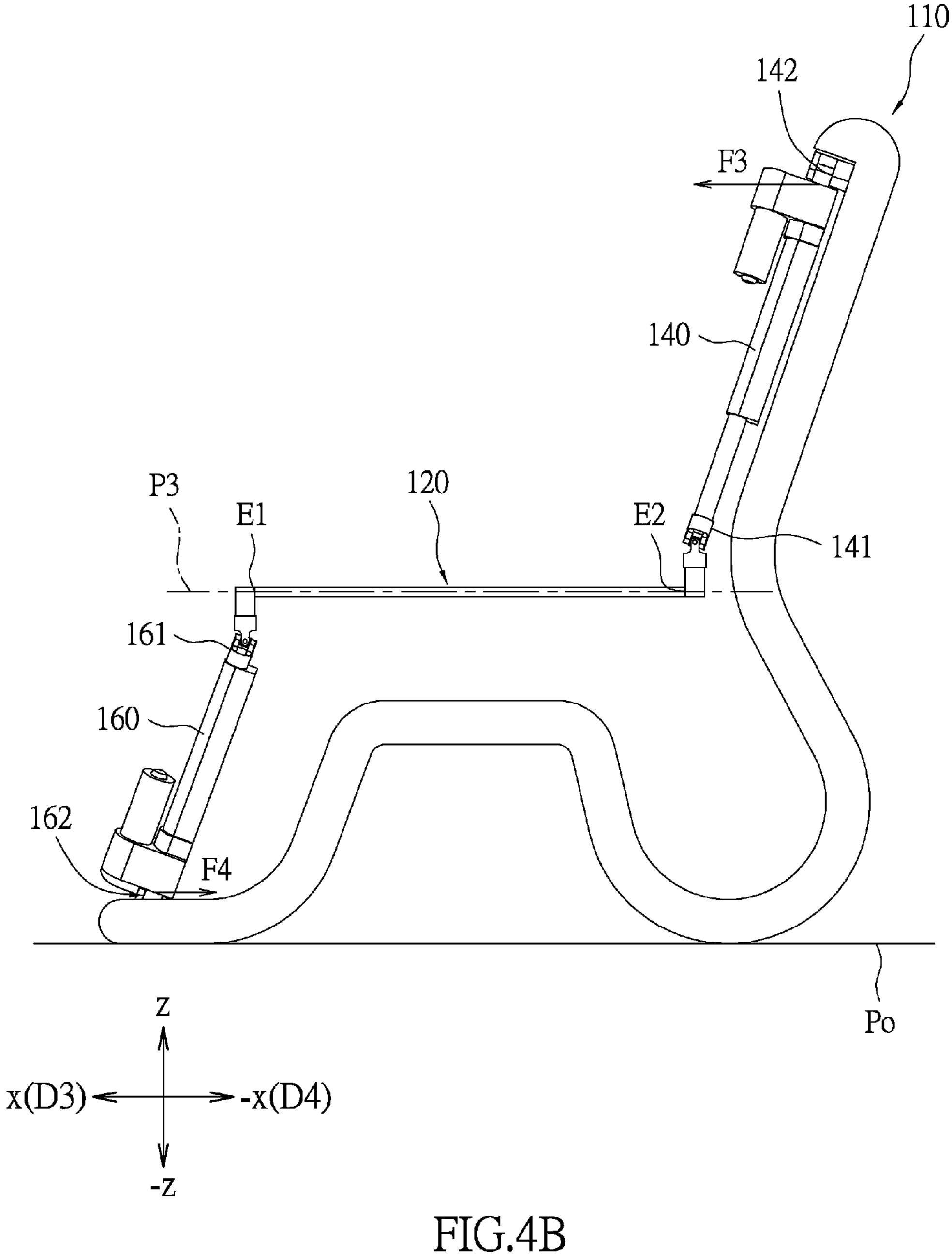
FIG. 4B is a side view illustrating the movement device having a Stewart platform provided in accordance to the first embodiment of the present disclosure.

To put it concretely, as referring to FIG. 4A and FIG. 4B, the upper extensible links 130,140 may be arranged in the first common plane P1, and the bottom extensible links 150,160 may be arranged in the second common plane P2. When the movement device is in the equilibrium condition, the first common plane P1 and the second common plane P2 are in parallel with one another. For instance, the first common plane P1 and the second common plane P2 slant toward the horizontal plane P0 at an angle G0.

More particular, the first common plane P1 and the second common plane P2 tilt backward, that is, to −x direction. However, the present disclosure is not limited thereby as those skilled in the art may choose any appropriate angle of tilt for the better seat pressure management and comfortable sitting postures adjustment. Consequently, the upper extensible links 130,140 respectively provide a component of a force F1 directed in a third direction D3, whereas the bottom extensible links 150,160 respectively provide a component of a force F2 directed in a fourth direction D4. The third direction D3 and the fourth direction D4 are in parallel with the horizontal plane P0 and are opposite to one another. In the instant embodiment, the third direction D3 is +x direction and the fourth direction D4 is −x direction.

Moreover, referring again to FIG. 3A or FIG. 3B, when the movement device is in the equilibrium condition, the vertical projections of the extension directions of the extensible links 130,140,150,160 on a normal plane Pn slant toward the horizontal plane P0. The normal plane Pn is perpendicular to the horizontal plane. In the instant embodiment, the normal plane Pn is the y-z plane. In particular, the vertical projection of the extension direction of the first bottom extensible link 150 on the normal plane Pn slants toward a first direction D1, whereas the vertical projections of the extension directions of the other three extensible links 130,140,160 on the normal plane Pn slant toward a second direction D2. The second direction D2 is opposite to the first direction D1.

In the instant embodiment, the first direction D1 is −y direction and the second direction D2 is +y direction. Consequently, the first bottom extensible link 150 provides a component of a force F3 directed in the first direction D1, whereas the other three extensible links 130,140,160 respectively provides a component of a force F4 directed in the second direction D2. So that the upper extensible links 130,140 can extend and retract in the same speed to provide a steady and smooth moving process to users. To put it concretely, the vertical projections on the normal plane Pn of the extension directions of the upper extensible links 130,140 and the first bottom extensible link 150 slant toward the horizontal plane P0 at an angle. The vertical projection on the normal plane Pn of the extension direction of the second bottom extensible link 160 slants toward the horizontal plane P0 at an angle.

In the instant embodiment, the vertical projection on the normal plane Pn of the extension direction of the first upper extensible link 130 slants towards the horizontal plane P0 at a first angle G1. The vertical projection on the normal plane Pn of the extension direction of the second upper extensible link 140 slants towards the horizontal plane P0 at a second angle G2. The vertical projection on the normal plane Pn of the extension direction of the first bottom extensible link 150 slants towards the horizontal plane P0 at a third angle G3. The vertical projection on the normal plane Pn of the extension direction of the second bottom extensible link 160 slants towards the horizontal plane P0 at a fourth angle G4. The third angle G3 is not equal to the other three angles G1, G2, G4. In particular, the first angle G1, the second angle G2, and the fourth angle G4 can be all equal to one other.

Furthermore, when the movement device is in the equilibrium condition, the front edge E1 and the back edge E2 of the platform 120 lie in the first direction D1 (−y) or the second direction D2 (+y). More specifically, when the movement device is in the equilibrium condition, the first ends 131,141 of the upper extensible links 130,140 point toward a first common axis L1, while the first ends 151,161 of the bottom extensible links 150,160 point toward a second common axis L2. It is worth to note that the first common axis L1 and the second common axis L2 are in parallel with the first direction D1 or the second direction D2.

Moreover, referring to FIG. 3A or FIG. 3B, when the movement device is in the equilibrium condition, the platform 120 is in parallel with the horizontal plane P0. That is, the front edge E1 and the back edge E2 of the platform 120 lie in a third common plane P3, which is in parallel with the horizontal plane P0. Or equivalently, when the movement device is in the equilibrium condition, the first ends 131,141,151,161 of the extensible links 130,140,150,160 all point toward the third common plane P3.

Figure 5:
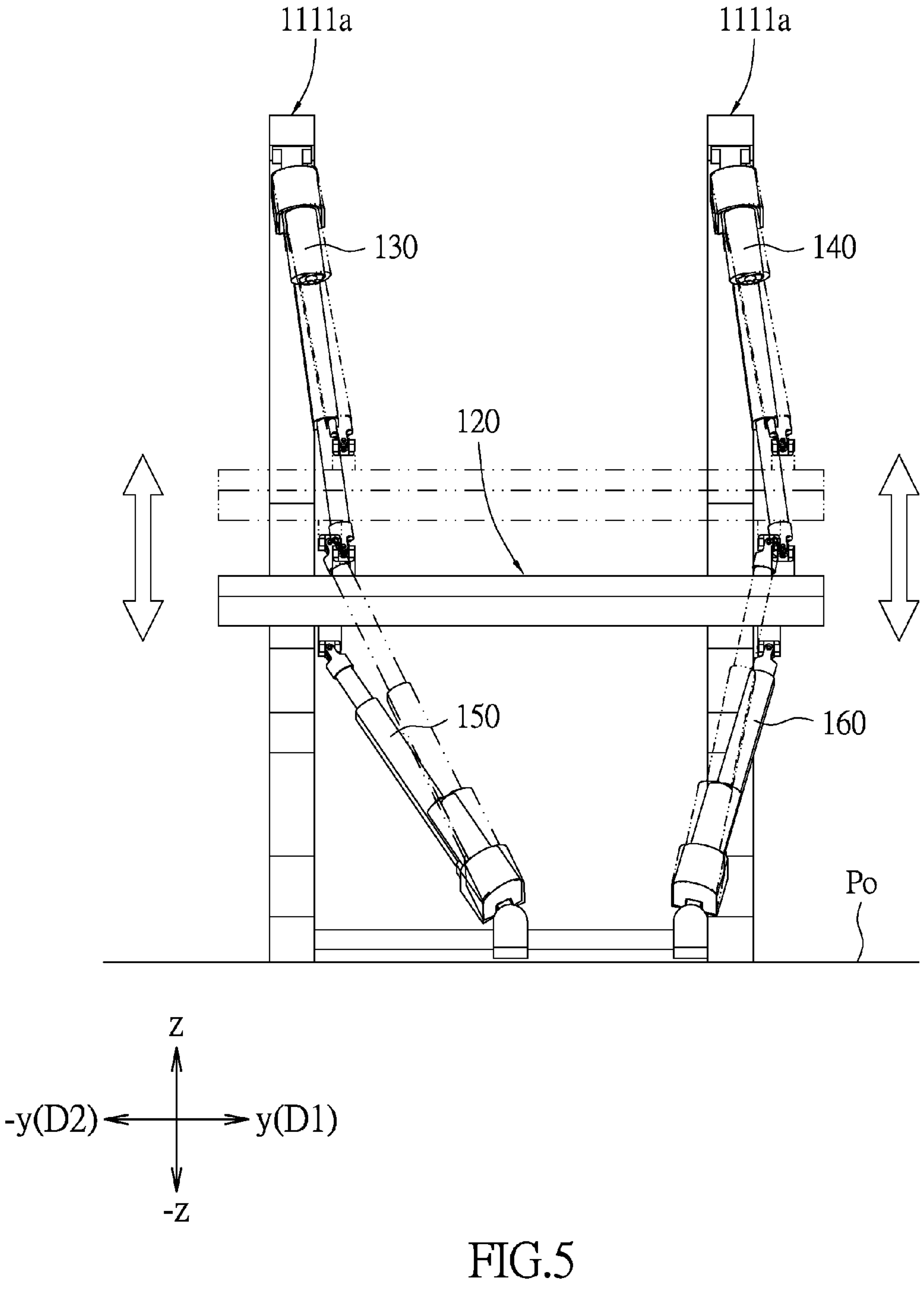
FIG. 5 is a front view illustrating the movement device having a Stewart platform provided in accordance to the first embodiment of the present disclosure when a movable platform is adjusted.

The operation of the movement device having a Stewart platform 100 is next described. Referring to FIG. 5, which is illustrating the movement device having a Stewart platform 100 when adjusting the elevation of the movable platform 120. When adjusting the elevation of the movable platform 120, the upper extensible links 130,140 retract, while the bottom extensible links 150,160 extend. When adjusting the descent of the movable platform 120, the upper extensible links 130,140 retract, while the bottom extensible links 150, 160 extend.

Figure 6:
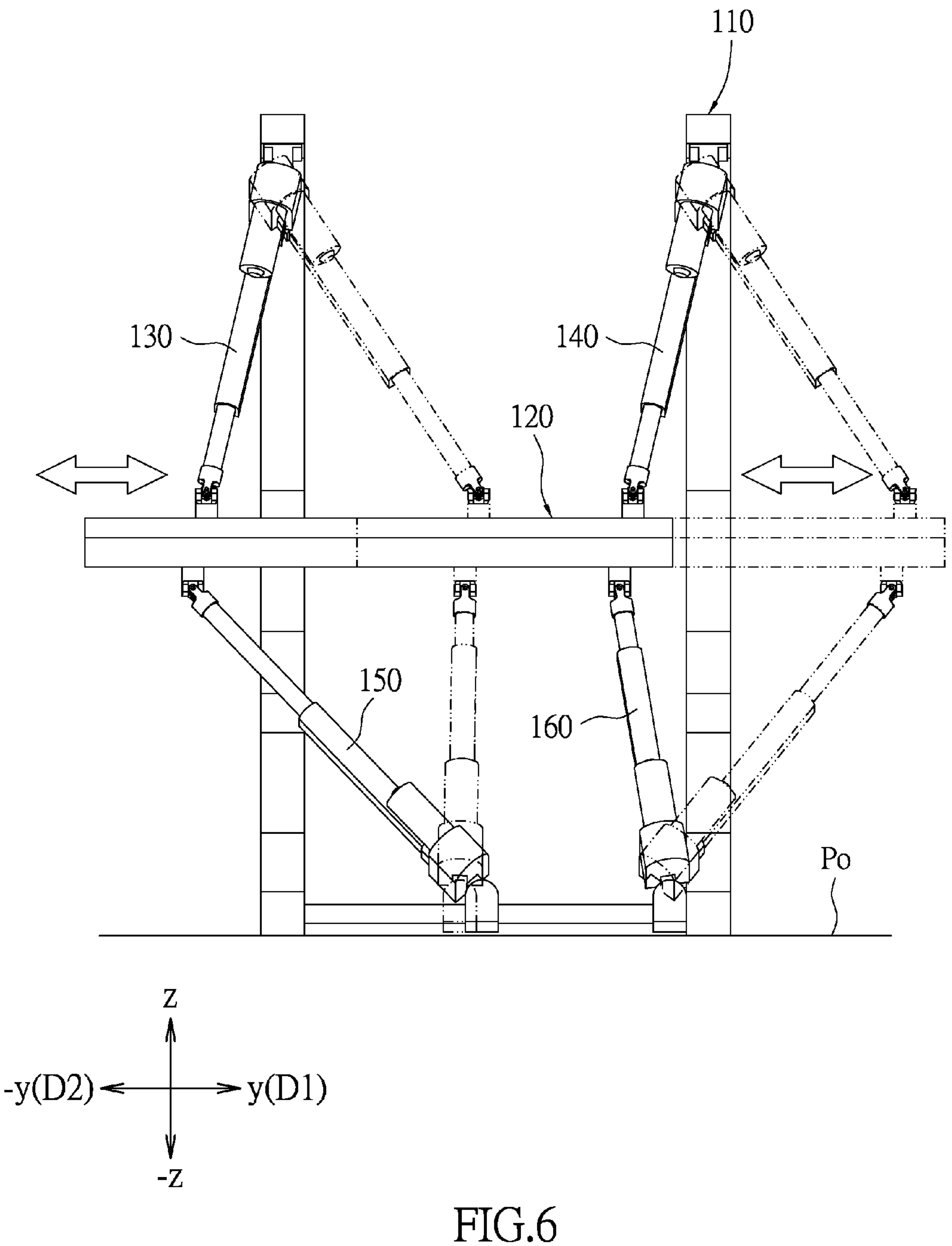
FIG. 6 is a front view illustrating the movement device having a Stewart platform provided in accordance to the first embodiment of the present disclosure when a movable platform is adjusted.

Referring to FIG. 6, which is illustrating the movement device having a Stewart platform 100 when adjusting the sideways motion of the movable platform 120. When adjusting the movable platform 120 sideways to the right, the upper extensible links 130,140 and the second bottom extensible link 160 extend, while the first bottom extensible link 150 retracts. When adjusting the movable platform 120 sideways to the left, the upper extensible links 130,140 and the second bottom extensible link 160 retract, while the first bottom extensible link 150 extends.

Figure 7:
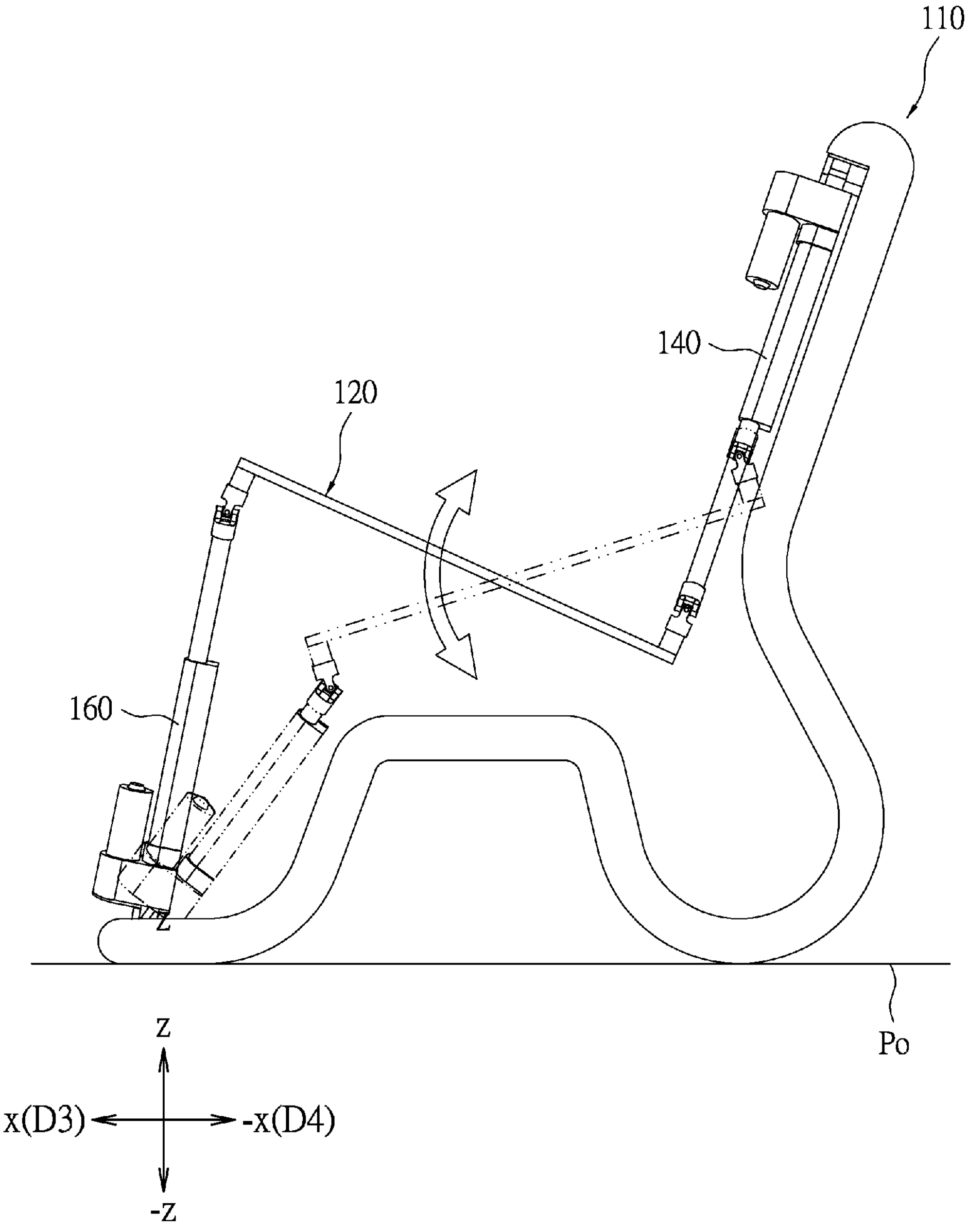
FIG. 7 is a side view illustrating the movement device having a Stewart platform provided in accordance to the first embodiment of the present disclosure when the movable platform is adjusted.

Referring to FIG. 7, which is illustrating the movement device having a Stewart platform 100 when adjusting the tilt-in-space motion of the movable platform 120. When adjusting the movable platform 120 tilting backward, all the four extensible links 130,140,150,160 extend. When adjusting the movable platform 120 tilting forward, all the four extensible links 130,140,150,160 retract.

The upper extensible links 130,140 and the second bottom extensible link 160 are arranged in such a way that the movement device having a Stewart platform 100 can be controlled in a linear manner. That is, when the user pushes a button to perform tilt-in-space, changes elevation or moves sideways, the upper extensible links 130,140 and the second bottom extensible link 160 extend or retract at the same speed. The first bottom extensible link 150 is the only one that has to be controlled in a nonlinear manner. Thereby, the movable platform 120 may maintain the horizontal orientation when changing elevation or moving sideways.

Simulation of the Movement Device Having a Stewart Platform

The motion of the movable platform 120 with respect to the length variation of each extensible link 130,140,150,160 is tested. The work space of the movement device having a Stewart platform 100 described in Table 2 is realized in the instant embodiment.

Figure 8A:
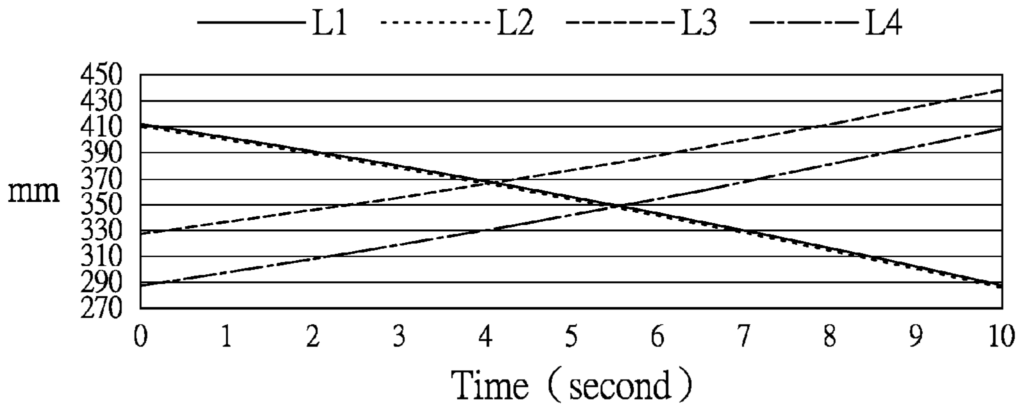
FIG. 8A is a diagram illustrating a relationship among lengths of a first upper extensible link, a second upper extensible link, a first bottom extensible link, a second bottom extensible link and time.
Figure 8B:
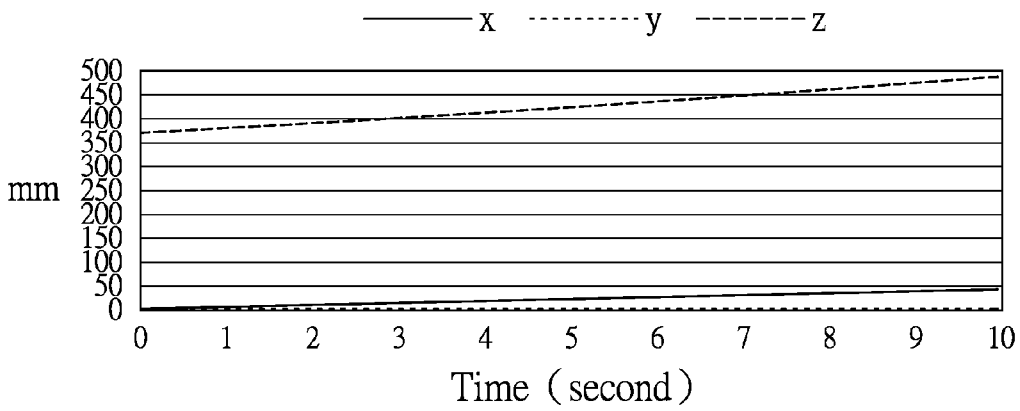
FIG. 8B is a diagram illustrating a relationship among positions of the movable platform in an x axis, a y axis, a z axis and time.

FIG. 8A and FIG. 8B show the test result of adjusting the platform 120 elevation from 370 mm to 488 mm in 10 seconds. The origin is set at the center of the platform 120. As shown in FIG. 8A, the variations of lengths of all extensible links 130,140,150,160 appear to be linear. In particular, the variation of the lengths of the upper extensible links 130,140 and the second bottom extensible link 160 are the same through the process, though the second bottom extensible link 160 extends while the upper extensible links 130,140 retract. As shown in FIG. 8B, the geometry of the movement device results in the platform 120 slightly moving forward or backward (x axis) simultaneously when the height of the platform 120 is changed. The range of this moving distance in the x axis is 43 mm.

Figure 9A:
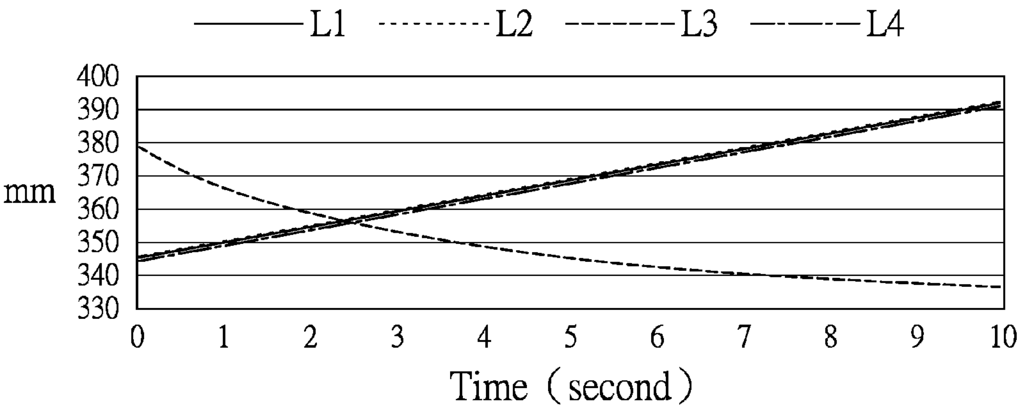
FIG. 9A is a diagram illustrating a relationship among lengths of the first upper extensible link, the second upper extensible link, the first bottom extensible link, the second bottom extensible link and time.
Figure 9B:
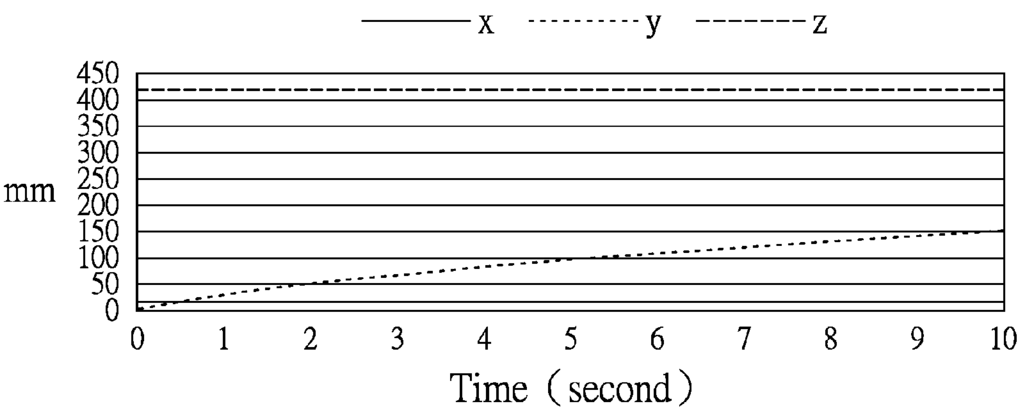
FIG. 9B is a diagram illustrating a relationship among positions of the movable platform in the x axis, the y axis, the z axis and time.

FIG. 9A and FIG. 9B show the test result of the platform 120 moving sideways at the initial height from 0 mm to 140 mm in 10 seconds. The origin is set at the center of the platform 120. As shown in FIG. 9A, the variations of lengths of the upper extensible links 130,140 and the second bottom extensible link 160 are the same through the process, while the length of the first bottom extensible link 150 varies in a nonlinear manner, caused by the geometry of the movement device mechanism. As shown in FIG. 9B, the platform 120 itself maintains a constant horizontal orientation (z and x axis) while moving sideways to the +y direction.

Figure 10A:
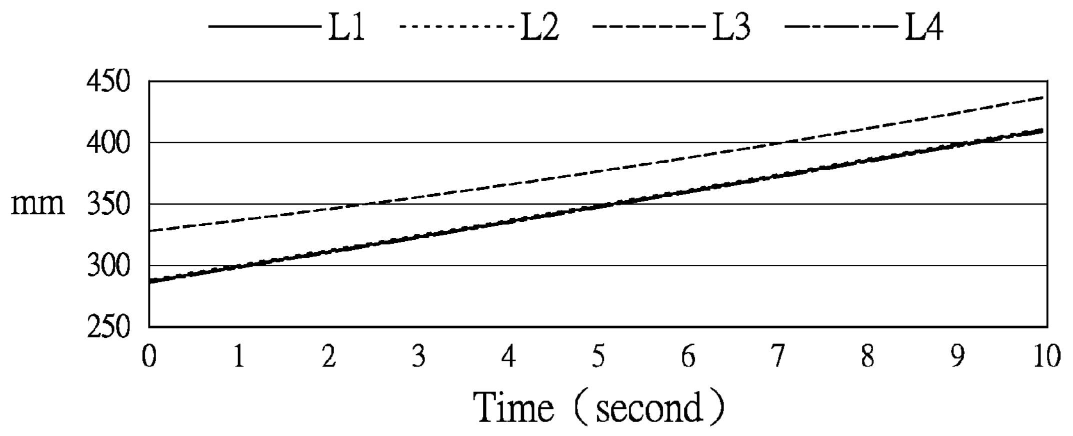
FIG. 10A is a diagram illustrating a relationship among lengths of the first upper extensible link, the second upper extensible link, the first bottom extensible link, the second bottom extensible link and time.
Figure 10B:
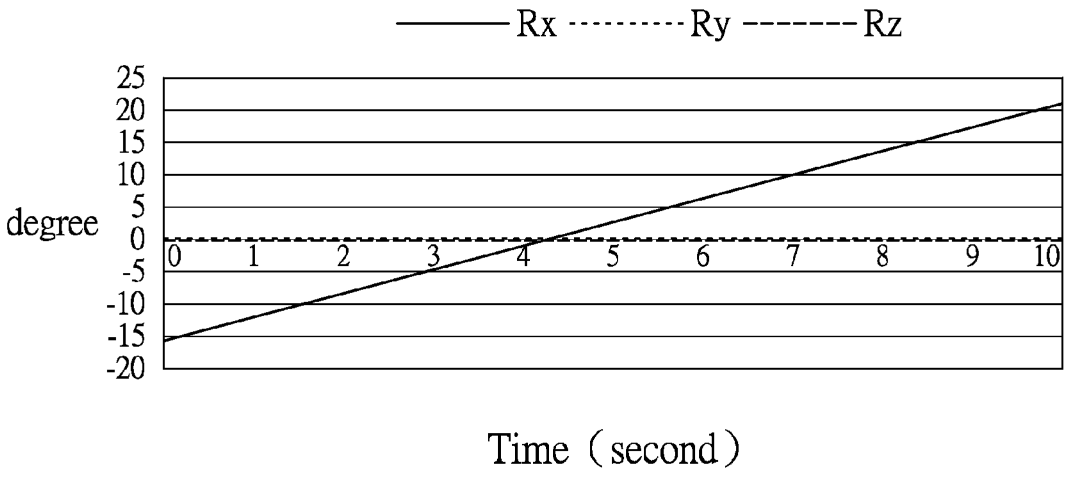
FIG. 10B is a diagram illustrating a relationship among orientations of the movable platform in the x axis, the y axis, the z axis and time.

FIG. 10A and FIG. 10B show the test result of the platform 120 tilt-in-space at the initial height from −15° (counterclockwise) to 22° (clockwise) in 10 seconds. The origin is set at the center of the platform 120. As shown in FIG. 10A, the variations of lengths of all extensible links 130,140,150,160 appear to be linear. In particular, the variation of the lengths of the upper extensible links 130,140 and the second bottom extensible link 160 are the same through the process. As shown in FIG. 10B, the platform 120 itself maintains a constant horizontal orientation in y and z axis while tilt-in-space in the x axis.

In all three tests, the speed of the upper extensible links 130,140 and the second bottom extensible link 160 are the same in the adjustment of platform 120 elevation, tilt-in-space, and sideways movement, which is important in the practical operation of the movement device. When the user simply pushes a button coupled to the operation device 180 to adjust the platform 120, the user can control the upper extensible links 130,140 and the second bottom extensible link 160 extend or retract at a preset constant speed. In other words, the speed of the first bottom extensible link 150 is the only parameter to be determined, which greatly reduces the complexity of the control scheme. The speed of the first bottom extensible link 150 can be determined from the position of the platform 120 and speed of other three extensible links 130,140,150.

In other instant embodiment, on the wheelchair with the movement device, the user can adjust the platform 120 by pushing three buttons located on the armrest of the wheelchair. When the wheelchair user pushes a button for tilt-in-space, a button for seat elevation adjustment, or a button for moving sideways, the upper extensible links 130,140 and the second bottom 160 extend or retract at a preset constant speed at all time. The extension or retraction speed of the first bottom extensible link 150 can be calculated by an Arduino microcontroller from the current position of the platform 120 to the expected position after a given interval of time.

In summary, the wheelchair with the movement device is capable of motion in heaving, pitching, and swaying to provide a comfortable seat adjustment function. The movement device with above described arrangement of the extensible links 130,140,150,160 can reduce the control complexity of the parallel mechanism, so that the wheelchair user can make the seat adjustment by simply pressing a button. When the user pushes a button to perform tilt-in-space, changes elevation or moves sideways, the upper extensible links 130,140 and the second bottom extensible link 160 can be controlled in a linear manner, while the first bottom extensible link 150 is the only one that has to be controlled in a nonlinear manner. Moreover, the upper extensible links 130,140 and the second bottom extensible link 160 can extend or retract at the same speed. The extensible links 130,140,150,160 are arranged in such a way that they can be controlled to provide a steady and smooth adjustment process to users or to maintain the horizontal orientation of the platform 120 when changing elevation or moving sideways.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A movement device having a Stewart platform, comprising:

- a supporting body, disposed on a horizontal plane;
- a movable platform;
- a first extensible link and a second extensible link, each rotatably connected to and having one degree of freedom with respect to the supporting body, respectively rotating about two rotation axes, and each rotatably connected to and having two degrees of freedom with respect to the movable platform, wherein the extension directions of the first and the second extensible links are parallel to each other; and
- a third extensible link and a fourth extensible link, each rotatably connected to and having two degrees of freedom with respect to the supporting body, and each rotatably connected to and having two degrees of freedom with respect to the movable platform;
- wherein when the movement device is in an equilibrium condition, the extension directions of the first and the second extensible links lie in a first common plane, the rotation axes are perpendicular to the first common plane, the vertical projections of the extension directions of the extensible links on a normal plane perpendicular to the horizontal plane slant toward the horizontal plane, wherein the vertical projection of the extension direction of the third extensible link slants toward a first direction whereas the vertical projections of the extension directions of the other three extensible links slant toward a second direction opposite to the first direction.

2. The movement device according to claim 1, wherein the vertical projection of the extension direction of the first extensible link slants toward the horizontal plane at a first angle, the vertical projection of the extension direction of the second extensible link slants toward the horizontal plane at a second angle, the vertical projection of the extension direction of the third extensible link slants toward the horizontal plane at a third angle, and the vertical projection of the extension direction of the fourth extensible link slants toward the horizontal plane at a fourth angle, wherein the third angle is not equal to the other three angles.

3. The movement device according to claim 2, wherein the first angle, the second angle, and the fourth angle are all equal to one other.

4. The movement device according to claim 1, wherein a first end of each extensible link has a universal joint for rotatably connecting to the movable platform; a second end of the first and the second extensible links have respectively a revolute joint for rotatably connecting to the supporting body; a second end of the third and the fourth extensible links have respectively a universal joint for rotatably connecting to the supporting body.

5. The movement device according to claim 4, wherein a distance between the first end of the first extensible link and the first end of the second extensible link is substantially equal to a distance between the first end of the third extensible link and the first end of the fourth extensible link.

6. The movement device according to claim 4, wherein a vertical distance between the second end of the first extensible link and the horizontal plane is substantially equal to a vertical distance between the second end of the second extensible link and the horizontal plane.

7. The movement device according to claim 4, wherein a vertical distance between the second end of the third extensible link and the horizontal plane is substantially equal to a vertical distance between the second end of the fourth extensible link and the horizontal plane.

8. The movement device according to claim 4, wherein the first ends of the first and the second extensible links point toward a first common axis, wherein the first common axis is in parallel with the first direction or the second direction.

9. The movement device according to claim 4, wherein the first ends of the third and the fourth extensible links point toward a second common axis, wherein the second common axis is in parallel with the first direction or the second direction.

10. The movement device according to claim 4, wherein the first ends of the extensible links point toward a third common plane, wherein the third common plane is in parallel with the horizontal plane.

11. The movement device according to claim 1, wherein the extension directions of the third and the fourth extensible links lie in a second common plane, the first common plane and the second common plane are parallel to each other, and the first common plane and the second common plane slant toward the horizontal plane.

12. The movement device according to claim 1, wherein the extensible links are linear actuators.

13. The movement device according to claim 1, wherein the first extensible link and the second extensible link are rotatably connected between an upper portion of the supporting body and the movable platform.

14. The movement device according to claim 1, wherein the third extensible link and the fourth extensible link are rotatably connected between a bottom portion of the supporting body and the movable platform.

15. The movement device according to claim 1, wherein the supporting body has a chassis, the chases includes a side rack and a bottom base, wherein the first and the second extensible links are rotatably connected between the side rack and the movable platform, the third and the fourth extensible links are rotatably connected between the bottom base and the movable platform.

16. The movement device according to claim 1, wherein the movable platform has a seat.

17. The movement device according to claim 1, further comprising an operation device for adjusting the length of the extensible links.

18. A movement device having a Stewart platform, comprising:
- a supporting body, disposed on a horizontal plane;
- a movable platform;
- a first extensible link and a second extensible link, each rotatably connected to and having one degree of freedom with respect to the supporting body, respectively rotating about two rotation axes, and each rotatably connected to and having two degrees of freedom with respect to the movable platform, wherein the extension directions of the first and the second extensible links are parallel to each other; and
- a third extensible link and a fourth extensible link, each rotatably connected to and having two degrees of freedom with respect to the supporting body, and each rotatably connected to and having two degrees of freedom with respect to the movable platform;
- wherein when the movement device is in a equilibrium condition, the extension directions of the first and the second extensible links lie in a first common plane, the rotation axes are perpendicular to the first common plane, the third extensible link provides a component of a force directed in a first direction parallel to the horizontal plane, whereas each of the other three extensible links provides a component of a force directed in a second direction opposite to the first direction.

19. A movement device having a Stewart platform, comprising:
- a supporting body, disposed on a horizontal plane;
- a movable platform;
- a first extensible link and a second extensible link, each rotatably connected to and having one degree of freedom with respect to the supporting body, respectively rotating about two rotation axes, and each rotatably connected to and having two degrees of freedom with respect to the movable platform, wherein the extension directions of the first and the second extensible links are parallel to each other; and
- a third extensible link and a fourth extensible link, each rotatably connected to and having two degrees of freedom with respect to the supporting body, and each rotatably connected to and having two degrees of freedom with respect to the movable platform;
- wherein when the movement device is in a equilibrium condition, each of the first and the second extensible links provides a component of a force directed in a third direction parallel to the horizontal plane, whereas each of the third and the fourth extensible links provides a component of a force directed in a fourth direction opposite to the third direction, and the third extensible link provides a component of a force directed in a first direction parallel to the horizontal plane, whereas each of the other three extensible links respectively provides a component of a force directed in a second direction opposite to the first direction.

* * * * *